(12) United States Patent
Wang et al.

(10) Patent No.: US 11,886,569 B2
(45) Date of Patent: Jan. 30, 2024

(54) VERIFYING DEVICE AND APPLICATION INTEGRITY

(71) Applicant: Google LLC, Mountain View, CA (US)

(72) Inventors: Gang Wang, Jersey City, NJ (US); Marcel M. Moti Yung, New York, NY (US); David Bruce Turner, Newark, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/431,486

(22) PCT Filed: Dec. 11, 2020

(86) PCT No.: PCT/US2020/064602
§ 371 (c)(1),
(2) Date: Aug. 17, 2021

(87) PCT Pub. No.: WO2021/236159
PCT Pub. Date: Nov. 25, 2021

(65) Prior Publication Data
US 2023/0060782 A1    Mar. 2, 2023

(30) Foreign Application Priority Data

May 21, 2020   (IL) .......................................... 274840

(51) Int. Cl.
*H04L 9/32*        (2006.01)
*G06F 21/44*       (2013.01)
(Continued)

(52) U.S. Cl.
CPC .............. *G06F 21/44* (2013.01); *G06F 21/45* (2013.01); *G06F 21/563* (2013.01);
(Continued)

(58) Field of Classification Search
CPC ........ G06F 21/44; G06F 21/45; G06F 21/563; G06F 2221/2129; H04L 9/3213; H04L 9/3268
See application file for complete search history.

(56) References Cited

U.S. PATENT DOCUMENTS

2002/0026576 A1\* 2/2002 Das-Purkayastha ........................ G06F 21/6218 726/5
2012/0047550 A1   2/2012 Lee et al.
2021/0067340 A1\* 3/2021 Ferenczi ................... H04L 9/30

FOREIGN PATENT DOCUMENTS

CA    3122700    6/2020
EP    1182534    2/2002
(Continued)

OTHER PUBLICATIONS

Decision to Grant a Patent in Japanese Appln. No. 2021-551561, dated Nov. 7, 2022, 5 pages (with English translation).
(Continued)

*Primary Examiner* — Nelson S. Giddins
(74) *Attorney, Agent, or Firm* — Fish & Richardson P.C.

(57) ABSTRACT

This disclosure relates to using trust tokens to verify the integrity of devices and applications from which data is received. In one aspects, a method includes receiving, from a client device, a request for one or more trust tokens. The request includes at least one of one or more device-level fraud detection signals obtained from the client device or data representing code of an application that initiated the request. The request also includes a respective nonce for each of the one or more trust tokens. A determination is made, based on at least one of the one or more device-level fraud signals or the data representing the code of the application, to issue the one or more trust tokens to the client device. Each trust token is generated using the nonce for the (Continued)

trust token. The one or more trust tokens are provided to the client device.

20 Claims, 5 Drawing Sheets

(51) Int. Cl.
*G06F 21/45* (2013.01)
*G06F 21/56* (2013.01)

(52) U.S. Cl.
CPC .......... *H04L 9/3213* (2013.01); *H04L 9/3268* (2013.01); *G06F 2221/2129* (2013.01)

(56) References Cited

FOREIGN PATENT DOCUMENTS

| | | |
|---|---|---|
| GB | 2482948 | 2/2012 |
| JP | 2004-030326 | 1/2004 |
| JP | 2012-043438 | 3/2012 |
| JP | 2020-513183 | 4/2020 |
| KR | 10-2016-0104737 | 9/2016 |
| WO | WO 2008/027653 | 3/2008 |
| WO | WO-2008027653 A1 * | 3/2008 ........... H04L 63/126 |

OTHER PUBLICATIONS

Office Action in Indian Appln. No. 202127036311, dated Dec. 27, 2022, 7 pages (with English translation).
International Search Report and Written Opinion in International Appln. No. PCT/US2020/064602, dated Mar. 26, 2021, 9 pages.
Office Action in Japanese Appln. No. 2021-551561, dated Sep. 12, 2022, 5 pages (with English translation).
Office Action in Korean Appln. No. 10-2021-7029299, dated Oct. 25, 2022, 12 pages (with English translation).
Intention to Grant in European Appln. No. 20838807.4, dated Nov. 10, 2022, 8 pages.
International Preliminary Report on Patentability in International Appln. No. PCT/US2020/064602, dated Dec. 1, 2022, 7 pages.
Notice of Allowance in Korean Appln. No. 10-2021-7029299, dated Apr. 13, 2023, 4 pages (with English translation).
Office Action in Israel Appln. No. 274840, dated Dec. 18, 2022, 3 pages.

* cited by examiner

VERIFYING DEVICE AND APPLICATION INTEGRITY

This application is a National Stage Application under 35 U.S.C. § 371 and claims the benefit of International Application No. PCT/US2020/064602, filed Dec. 11, 2020, which claims priority to Israel Application No. 274840, filed May 21, 2020. The disclosures of the foregoing applications are incorporated herein by reference.

BACKGROUND

Client devices transmit data over public networks, such as the Internet. These communications can be intercepted and/or altered by entities other than the intended recipient. In addition, the entities can forge network identities and send data that appears to originate from these forged network identities. The entities can also alter application code to insert malicious code that sends fraudulent data.

SUMMARY

This specification describes technologies relating to using trust tokens to verify the integrity of devices and applications from which data is received.

In general, one innovative aspect of the subject matter described in this specification can be embodied in methods that include receiving, from a client device, a request for one or more trust tokens. The request includes at least one of (i) one or more device-level fraud detection signals obtained from the client device or (ii) data representing code of an application that initiated the request; and a respective nonce for each of the one or more trust tokens A determination is made, based on at least one of (i) the one or more device-level fraud signals or (ii) the data representing the code of the application, to issue the one or more trust tokens to the client device. In response to determining to issue the one or more trust tokens to the client device, each of the one or more trust tokens is generated using the nonce for the trust token and the one or more trust tokens are provided to the client device. Other implementations of this aspect include corresponding apparatus, systems, and computer programs, configured to perform the aspects of the methods, encoded on computer storage devices.

These and other implementations can each optionally include one or more of the following features. In some aspects, determining, based on at least one of (i) the one or more device-level fraud signals or (ii) the data representing the code of the application, to issue the one or more trust tokens to the client device includes determining, based on the one or more device-level fraud signals, that the client device is a trusted device, determining, based on the data representing the code of the application, that the application is a trusted application, and in response to determining that the client device is a trusted device and the application is a trusted application, determining to issue the one or more trust tokens to the client device.

In some aspects, the data representing the code of the application includes a cryptographic hash of the code of the application. Determining to issue the one or more trust tokens to the client device can include determining, based on the code of the application, that the application is a trusted application and, in response to determining that the application is a trusted application, determining to issue the one or more trust tokens to the client device.

In some aspects, determining that the application is a trusted application includes comparing a cryptographic hash of the code of the application to cryptographic hashes of code of official builds of the application and determining that the application is a trusted application in response to the cryptographic hash of the code of the application matching a cryptographic hash of code of an official build of the application.

In some aspects, determining that the application is a trusted application includes determining that a certificate indicating that the application does not include malicious application logic has been issued for the application.

In some aspects, the nonce for each trust token is a blinded nonce that was blinded using a blind signature scheme. Generating each of the one or more trust tokens can include generating, using a blind signature scheme, a blind signature of the blinded nonce for the trust token. The trust token can include the blinded nonce and the blind signature of the blinded nonce.

Some aspects can include receiving, from the client device, a redemption request including a given trust token for redemption. The given trust token can include an unblinded nonce and a blind signature generated based on a blinded version of the nonce. The blinded signature of the given trust token can be validated using the unblinded nonce and the blind signature scheme. In response to validating the blinded signature, a signed redemption record for the given trust token is sent to the client device.

In some aspects the request includes a public key for the client device. Each of the one or more trust tokens can be encrypted using the public key for the client device. Providing the one or more trust tokens to the client device can include providing the one or more encrypted trust tokens to the client device.

In some aspects, the request includes a device identifier for the client device. A historical record of trustworthiness for the client device can be maintained using the device identifier. Determining to issue the one or more trust tokens to the client device can include determining, based on a combination of the device-level fraud detection signals and the historical record of trustworthiness for the client device, that the client device is a trusted device.

In some aspects, determining, based on a combination of the device-level fraud detection signals and the historical record of trustworthiness for the client device, that the client device is a trusted device includes determining, based on a combination of the device-level fraud detection signals, the historical record of trustworthiness for the client device, and a number of trust tokens requested by client device during a given time period, that the client device is a trusted device.

The subject matter described in this specification can be implemented in particular embodiments so as to realize one or more of the following advantages. Recipients that receive requests (or other communications or data) from a device can verify that the device and an application running on the device that sent the request is a trustworthy device based on a trust token issued to the device, e.g., based on a signed redemption record provided to the device when the trust token is redeemed. This token and/or signed redemption record certifies that the device and its application are trustworthy based on an evaluation by a trust token system.

The trust token system can evaluate device-level fraud detection signals to determine whether the client device is trusted. The trust token system can also determine whether the application, e.g., a web browser, that initiated the request is a trusted application, e.g., based on whether the build of the application on the device is an official build prior to issuing a trust token. This ensures that the device is a genuine device (e.g., rather than a virtual machine in a data center or a malware infected/compromised device) and that the application is not a custom build with potentially malicious code inserted. The use of trust tokens issued based on this combination of evaluations can protect recipients from abuse (e.g., malicious bots attempting to create fake accounts or taking over a user's real account) and fraud (e.g., malicious parties attempting to profit from falsified requests/communications), and ensures trust in systems and protocols that rely on trustworthy communications received from the devices and applications. The disclosed systems and methods therefore provide a technical advantage of providing a secure means for communication between devices. Moreover, the disclosed systems and methods are able to provide this secure means of communication whilst maintaining user privacy, since the disclosed systems and methods are able to issue trust tokens based on device-level and application-level information, thereby avoiding the need to evaluate user-level data (such as browsing history or other user profile information) in order to determine whether a client device is trustworthy. Thus, the disclosed systems and methods also provide a technical advantage of protecting user information and maintaining user privacy.

The trust token can be generated based on a blinded nonce that is blinded at the client device and sent to the trust token system. The client device can unblind the nonce of the trust token prior to redeeming the trust token with the trust token system. In this way, user privacy is protected as the trust token system cannot correlate the blinded nonce of issued trust tokens with the unblinded nonce of redeemed trust tokens. This therefore provides a technical advantage of maintaining user privacy with regards to the device-level and application-level signals. User privacy can be further improved by issuing trust tokens based on device and application signals only, independent of signals related to the user of the client device. Such information related to the user of the client device, such as browsing history or other data that is personal to the user of the client device is therefore not necessary in order to issue trust tokens, and so this information does not need to be transmitted to the trust token issuer for evaluation. In this way, personal user information is protected and so this provides a technical advantage of maintaining user privacy.

Trust tokens can be requested and issued in batches. This reduces the burden placed on the trust token system (e.g., the number of CPU cycles used) as the trust token system issued multiple tokens based on a single evaluation of the client device and application and therefore provides a technical advantage of reducing the resources required to issue multiple trust tokens. This also reduces latency at the client device as the tokens can be issued to the client device in advance of any requests that require trust token verification rather than wait for an evaluation of the client device for each request and therefore also provides a technical advantage of a more responsive system with reduced latency for issuing trust tokens.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for using trust tokens to verify the integrity of devices and applications from which requests, communications, or other data is received. Recipients of some types of requests received from a client device want to ensure that the requests are valid and not received from a compromised or fraudulent device or application. For example, a user privacy system may want to ensure that requests to change privacy settings for a user are received from a genuine client device and from an official build of an application rather than from a fraudulent virtual machine running in a data center or a custom build of an application with malicious code, thereby enhancing user privacy when using applications. Although the following description is largely in terms of requests sent by a client device, the techniques can be used to verify the integrity of other types of data or communications received from client devices.

An application that will send requests for which trustworthiness is deemed important, e.g., by the recipients of the requests, can request trust tokens from a trust token system. The trust token system can evaluate the trustworthiness of the client device and the application and, if both are deemed trusted, the trust token system can issue trust tokens to the client device. When the application later submits a request to a recipient, the application can redeem the trust token for a signed redemption record (SRR), which the application can include in the request. As described in more detail below, the SRR can include a digital signature generated by the trust token system to ensure that data of the request is not manipulated and prove that the client device and application was evaluated and/or deemed trustworthy by the trust token system. This provides a secure means for determining that a client device is trustworthy, since the digital signature generated by the trust token system verifies that the client device is trustworthy, and the digital signature also ensures that this verification has not been manipulated with.

Figure 1:
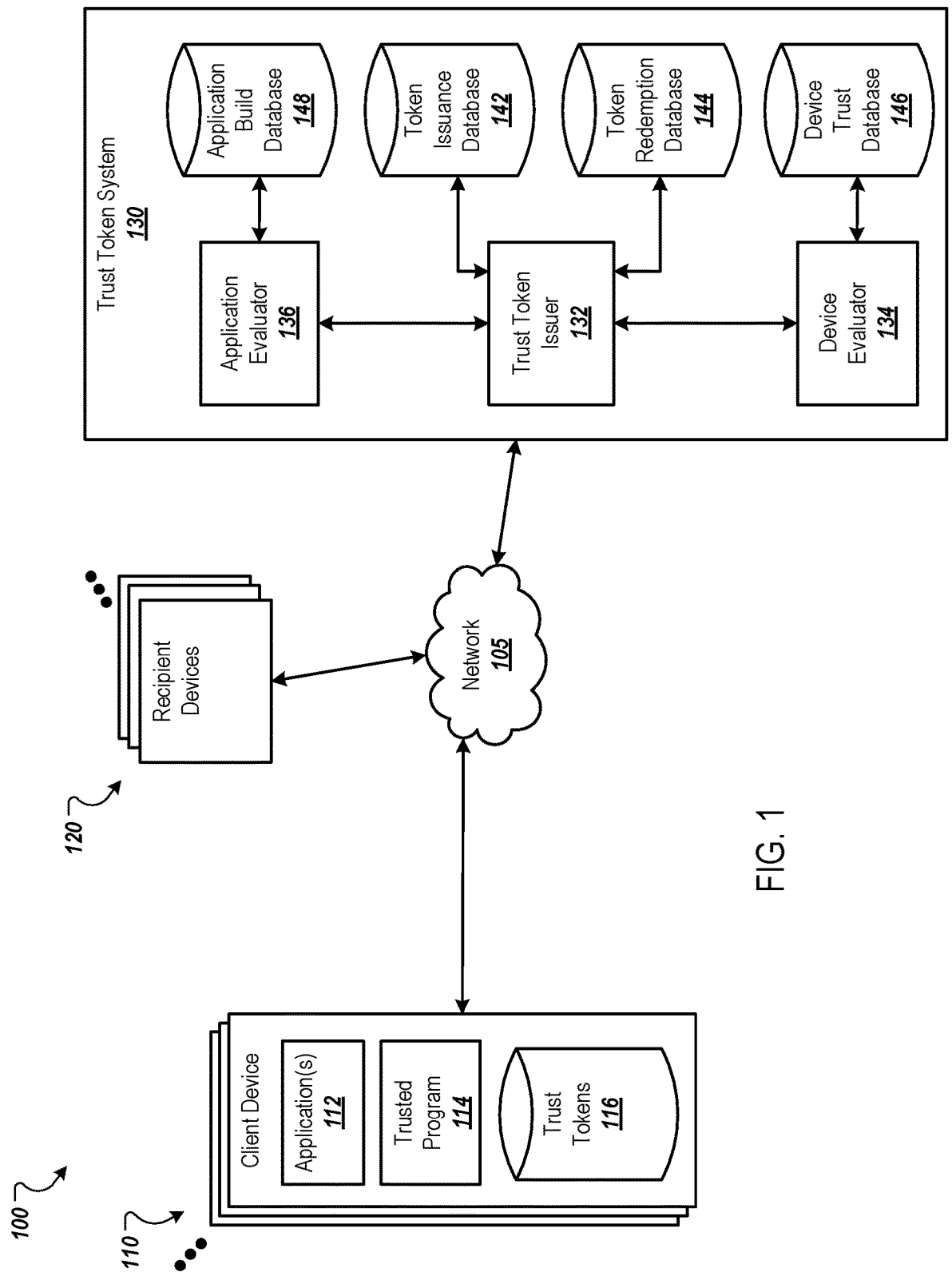
FIG. 1 is a block diagram of an example environment in which a trust token system issues and redeems trust tokens.

FIG. 1 is a block diagram of an example environment 100 in which a trust token system 130 issues and redeems trust tokens. The example environment 100 includes a data communication network 105, such as a local area network (LAN), a wide area network (WAN), the Internet, a mobile network, or a combination thereof. The network 105 connects client devices 110, recipient devices 120 of recipients and the trust token system 130. The example environment 100 may include many different client devices 110, trust token systems 130, and recipient devices 120.

A client device 110 is an electronic device that is capable of communicating over the network 105. Example client devices 110 include personal computers, mobile communication devices, e.g., smart phones, and other devices that can send and receive data over the network 105.

A client device 110 typically includes applications 112, such as web browsers and/or native applications, to facilitate the sending and receiving of data over the network 105. A native application is an application developed for a particular platform or a particular device. In some implementations, the client device 110 is a digital media device, e.g., a streaming device that plugs into a television or other display to stream videos to the television. The digital media device can also include a web browser and/or other applications that stream video and/or present resources.

The client device 110 also includes a trusted program 114. The trusted program 114 can include trusted code from a reliable source that is difficult to falsify. For example, the trusted program 114 can be an operating system, a portion of an operating system, a web browser, etc. Generally, the trusted program 114 is difficult to infiltrate, and the amount of time and effort that a perpetrator would need to expend to tamper with the trusted program 114 is prohibitively high. Additionally, because the trusted program 114 is provided and maintained by a reliable source, any vulnerabilities that arise can be addressed by the source. Using such a trusted program in this way provides a technical advantage of increased security at the client device, since the trusted program is difficult to infiltrate. Additionally, the trusted program provides the advantage of mitigating vulnerabilities in the trusted program because the program is maintained by a reliable source.

The trusted program 114 can be local to user device 110. For example, the trusted program 114 can be a device driver of the operating system of user device 110. In some implementations, the trusted program 114 operates entirely locally to user device 110, reducing the need to transmit user information. In some implementations, the trusted program 114 can operate locally to user device 110 and over a network, such as network 105. For example, the trusted program 114 can be a web browser that is installed on user device 110 and transmits and receives information over the network 105.

The applications 112 can send requests to the recipient devices 120 of the recipients. The recipient devices 120 can be computers (e.g., servers), mobile communication devices, and other devices that can send and receive data over the network 105. The requests can include requests to update settings, e.g., user privacy settings, requests for content, requests to report data, requests to install an application, and/or other appropriate types of requests. An example recipient is a content provider that provides content in response to requests.

For some requests, the applications 112 can include a trust token or an SSR based on a redeemed trust token to verify that the request is being sent by a trusted application and a trusted device. An application 112 can request one or more trust tokens from the trust token system 130, e.g., via the trusted program 114. For example, the application 112 can call an Application programming Interface (API) of the trusted program 114 to request the trust token(s). The trusted program 114 can then request the trust token(s) from the trust token system 130.

The trusted program 114 can collect and include a set of data in the request for trust tokens for an application. This set of data can include a nonce for each requested trust token. A nonce is an arbitrary (e.g., random or pseudo-random) number. In some implementations, rather than including a plaintext nonce for each trust token, the request includes a blinded nonce for each requested trust token. The trusted program 114 (or the application 112 itself) can generate a nonce and blind the nonce using a blind signing scheme. Blinding a nonce can include hiding or obscuring the value of the nonce, e.g., by combining the nonce with a blinding factor. The blind signing scheme can include the Internet Engineering Task Force (IETF) Verifiable Oblivious Pseudorandom Function (VOPRF) protocol, RSA (Rivest-Shamir-Adleman), or another appropriate blind signature scheme. As described in more detail below, the nonces are used to generate the trust tokens and using blinded nonces provides a technical advantage of improving user privacy.

The set of data of a request for trust tokens can include device-level fraud detection signals. The device-level fraud detection signals can include data representing operating characteristics or metrics of the client device that can be used to determine whether a client device is compromised or whether the client device is operating as a normal client device or an emulated client device. Certain operating characteristics and metrics are often different for genuine client devices relative to emulators. In some implementations, the device-level fraud detection signals include application-level fraud detection signals that include operating characteristics and metrics of the application 112 requesting trust tokens. The trusted program 114 can collect these device-level fraud detection signals and include the signals in the request for trust tokens.

The set of data in a request for trust tokens can also include data related to the application 112 that initiated the request for trust tokens and that will ultimately use the trust tokens. This data can include an identity of the application, e.g., a package name for the package file of the application and data that can be used to determine whether the instance of the application 112 on the client device 110 is an official build of the application. This data can include data representing code of the application 112. For example, the trusted application 114 can generate a cryptographic hash of code of the application 112 using a cryptographic hash function and include the hash of the code in the request. The hash can be a hash of the application binary file(s) for the application 112, hash of the executable file for the application 112, and/or a hash of all files of the currently running build of the application 112 at the client device 110. In some implementations, the data can also include a hash of a certificate signed by the developer of the application 112 using a private key of the developer. The trusted program 114 can generate the hash at request time to ensure that the hash represents the current build of the application 112 running on the client device 110.

In some implementations, the set of data of a request for trust tokens can include a unique device identifier for the client device 110 that is submitting the request. This device identifier can be a public key of the client device. For example, the client device 110 can include an asymmetric cryptography key pair that includes a public key and a private key that corresponds to, e.g., is mathematically linked to, the public key. As described in more detail below, the device identifier can be used to limit the number of trust tokens issued to a given client device and/or to maintain a historical record of trustworthiness for the client devices 110.

The trust token system 130 can receive trust token requests from the client devices 110, issue trust tokens in response to at least some of the requests, and redeem trust tokens for the client devices 110. The trust token system 130 includes a trust token issuer 132, a device evaluator 134, and an application evaluator 136, each of which can be implemented using one or more data processing apparatus, e.g., one or more server computers. In some implementations, two or more of the trust token issuer 132, the device evaluator 134, and the application evaluator 136 are implemented on a same computer.

In some implementations, the trust token system 130 is maintained and operated by the entity that develops the trusted program 114. For example, if the trusted program 114 is an operating system, the trust token system 130 can be operated by the operating system developer. In some implementations, the trust token system 130 is operated by a different entity than the entity that develops the trusted program 114, e.g., by a third-party device and application fraud detection system.

The device evaluator 134 evaluates the device-level fraud detection signals of a trust token request to determine whether the client device 110 from which the trust token request was received is a trusted device. The device evaluator 134 can determine a level of trustworthiness of the client device 110 based on the fraud detection signals. For example, the level of trustworthiness can be on a numerical scale, e.g., 1-3, 0-10, 0-100, or another appropriate scale. The device evaluator 134 can classify the client device 110 as a trusted device if the level of trustworthiness satisfies a trustworthiness threshold, e.g., meets or exceeds the threshold.

In some implementations, the device evaluator 134 distinguishes between genuine client devices, emulators, rooted devices, and/or other appropriate categories of devices based on the device-level fraud detection signals. In this example, the device evaluator 134 can classify the client device as a trusted device when the client device is classified in a particular category, e.g., the genuine client device category.

The device evaluator 134 can store the classification(s) for the client devices 110 in a device trust database 146 or other appropriate data structure. For each client device 110, the device trust database 146 can include the device identifier for the client device 110 and a historical record of trustworthiness for the client device 110. The historical record can include one or more historical classifications of the client device 110. For example, the historical record of trustworthiness for a client device 110 can include, for a given time period, the level of trustworthiness for the client device 110 and/or the classification of the client device 110 (e.g., trusted or not and/or the category). The given time period can include all requests received from the client device 110 having the same device identifier (as the device identifier can change in some implementations) or for a limited time period (e.g., the last week, month, year, etc.)

The historical record of trustworthiness for a client device 110 can be used to determine whether to issue trust tokens to the client device 110 in response to a trust token request. In some implementations, the trust token issuer 132 can consider patterns of trustworthiness for a client device 110 to determine whether to issue a trust token to the client device 110. For example, a malicious party may operate a client device 110 in a normal way parts of the time and in fraudulent ways parts of the time. The historical record for this client device 110 may indicate that the client device 110 is trusted at some points in time and not trusted in other points in time. In other words, there may be one or more previous instances at which the client device 110 was determined to be trustworthy, and one or more previous instances at which the client device 110 was determined to be untrustworthy. In this example, the trust token system 130 may issue a trust token to the client device 110 even if the result of the evaluation is that the client device 110 is not trusted to avoid the malicious party from learning how to game the system. This provides a technical advantage of preventing malicious parties from determining how the trust token issuer operates, thereby providing security over the trust token issuer. Specifically, if a malicious party were to learn how the trust token system operates, that party may be able to manipulate the system in order to obtain trust tokens despite being untrustworthy. Thus, by preventing the malicious party from learning how the system works in this way provides increased security. In another example, if the historical record indicates that a client device 110 is not trusted most or all of the time, the trust token system 130 may not issue a trust token to the client device 110 unless the client device 110 is deemed trusted for at least a threshold number of consecutive evaluations or for a threshold time period, e.g., a week, a month, etc. The historical record therefore can be used to determine whether or not a client device is trustworthy and thus provides a technical advantage of providing a means for detecting whether a device is trustworthy or not.

The application evaluator 136 evaluates the data of a trust token request to determine whether the instance of the application 112 on the client device 110 is an official build of the application. The application evaluator 136 can access an application build database 148 (or other appropriate data structure) that includes hashes of code of official builds of applications 112. For example, when an application developer releases a new build of an application, the application developer can provide the code of the application to the trust token system 130. The trust token system 130 can generate a hash of the code using the same cryptographic function that the trusted program 114 of the client device 110 uses to generate the hash of the code of application 112. The application build database 148 can include, for each application, the identifier for the application and, for each official build of the application, the hash of the code of the application. In some implementations, the trust token system 130 can receive the code for each application from an application store that makes the applications available for downloading to the client devices 110.

The application evaluator 136 can compare the hash of the application included in the trust token request to the hash of the application for each official build of the application stored in the application build database 148. The application evaluator can use the identifier for the application 112 included in the trust token request to identify the hashes for the official builds of the application 112 in the application build database. If there is a match between the hash of the code of the application 112 in the trust token request and hash of the code of an official build of the application 112, the application evaluator 136 can determine that the instance of the application running on the client device 110 is an official build of the application and that the application is a trusted application. If there is no match, the application evaluator 136 can determine that the instance of the application running on the client device 110 is not an official build of the application.

In some implementations, the trust token request does not have to include the identifier for the application 112. In this example, the application evaluator 136 can compare the hash of the code of the application to the hashes of the code of multiple applications to determine whether there is a match.

In some implementations, the application evaluator 136 can determine that the instance of the application running on the client device 110 is not a trusted application in response to the instance not being an official build. In some implementations, the application evaluator 136 can consider additional information in response to determining that the instance is not an official build. For example, the application evaluator 136 can consider network traffic analysis data that indicates a percentage of network traffic from unofficial builds of the application that is classified as malicious or invalid. If at least a threshold percentage (e.g., 80%, 50%, 100%, or another appropriate threshold) of network traffic from unofficial builds of the application are considered malicious or invalid, the application evaluator 136 can determine that any instance of the application that is not an official build is not trusted.

The trust token issuer 132 can determine whether to issue trust tokens in response to a trust token request based on the data included in the trust token request and/or the determinations made by the device evaluator 134 and/or the application evaluator 136. For example, the trust token issuer 132 can determine whether to issue trust tokens in response to a trust token request based on the device-level fraud detection signals and/or the data representing the code of the application.

Figure 2:
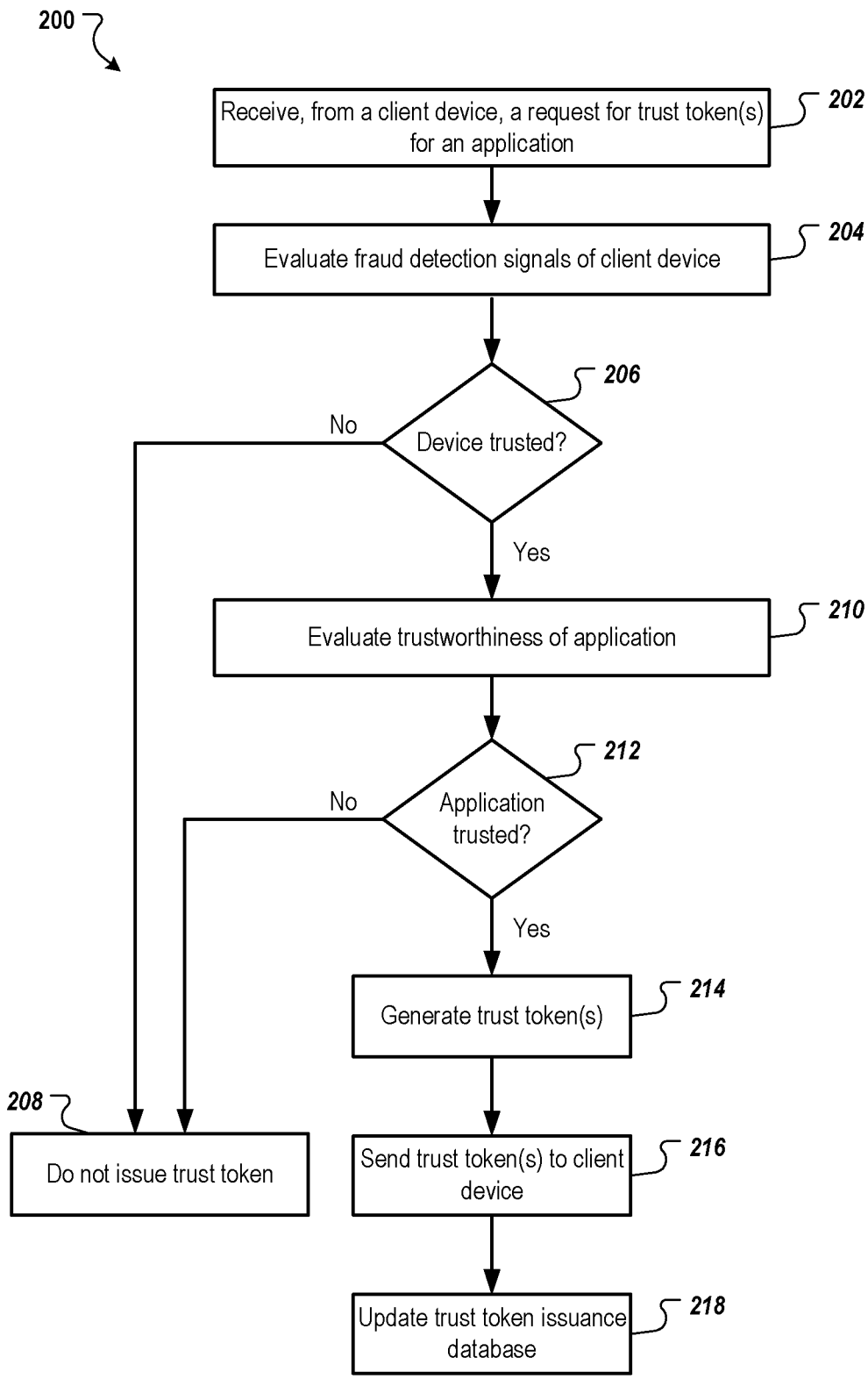
FIG. 2 is a flow diagram that illustrates an example process for issuing trust tokens.

In some implementations, the trust token issuer 132 can issue trust tokens to a client device 110 in response to a trust token request when the device evaluator 134 determines that the client device 110 is a trusted device and/or the application evaluator 136 determines that the application 112 is a trusted application. In some implementations, the trust token issuer 132 determines to issue trust tokens to a client device 110 only when the client device 110 is deemed a trusted device and the application 112 is deemed a trusted application. In some implementations, the trust token issuer 132 determines to issue trust tokens when at least one of the device evaluator 134 or the application evaluator 136 outputs a trustworthy verdict. Other implementations may only include one of the device evaluator 134 or the application evaluator 132 such that the trust token issuer 132 issues tokens to a client device 110 when the one evaluator deems the client device 110 or the application 112 to be trusted. An example process for issuing trust tokens is illustrated in FIG. 2 and described below.

The trust token issuer 132 can maintain a count of the number of trust tokens issued to client devices 110 in a token issuance database 142 (or other appropriate data structure). The token issuance database 142 can include, for each device identifier, a count of the number of trust tokens issued to the client device 110 corresponding to the device identifier over one or more time periods, e.g., each day, each week, each month, and/or overall since the first trust token request that includes the device identifier. The trust token issuer 132 can use this data to limit the number of trust tokens issued to a client device 110 or prevent trust tokens from being issued to that device altogether. For example, if the number of requested trust tokens is abnormally high for the client device, e.g., based on historical trends for the client device 110, the trust token issuer 132 may stop issuing trust tokens to the client device 110 as the client device 110 may be recently compromised. This provides a technical advantage of preventing potentially untrustworthy devices from being issued with trust tokens even if the device-level and application-level signals indicate that the device is trustworthy, thereby providing an improved method for detecting untrustworthy devices. This also provides a technical advantage of maintaining security by preventing untrustworthy devices from being deemed as trustworthy.

The trust token issuer 132 can also redeem trust tokens for client devices 110. When an application 112 of a client device 110 is about to send a request for which an SRR is appropriate, the application 112 can send a request to redeem a trust token to the trust token system 130. The request can include a trust token issued to the client device 110. The trust token issuer 132 can evaluate the trust token and, if valid, the trust token issuer can generate an SRR and send the SRR to the client device 110.

Figure 3:
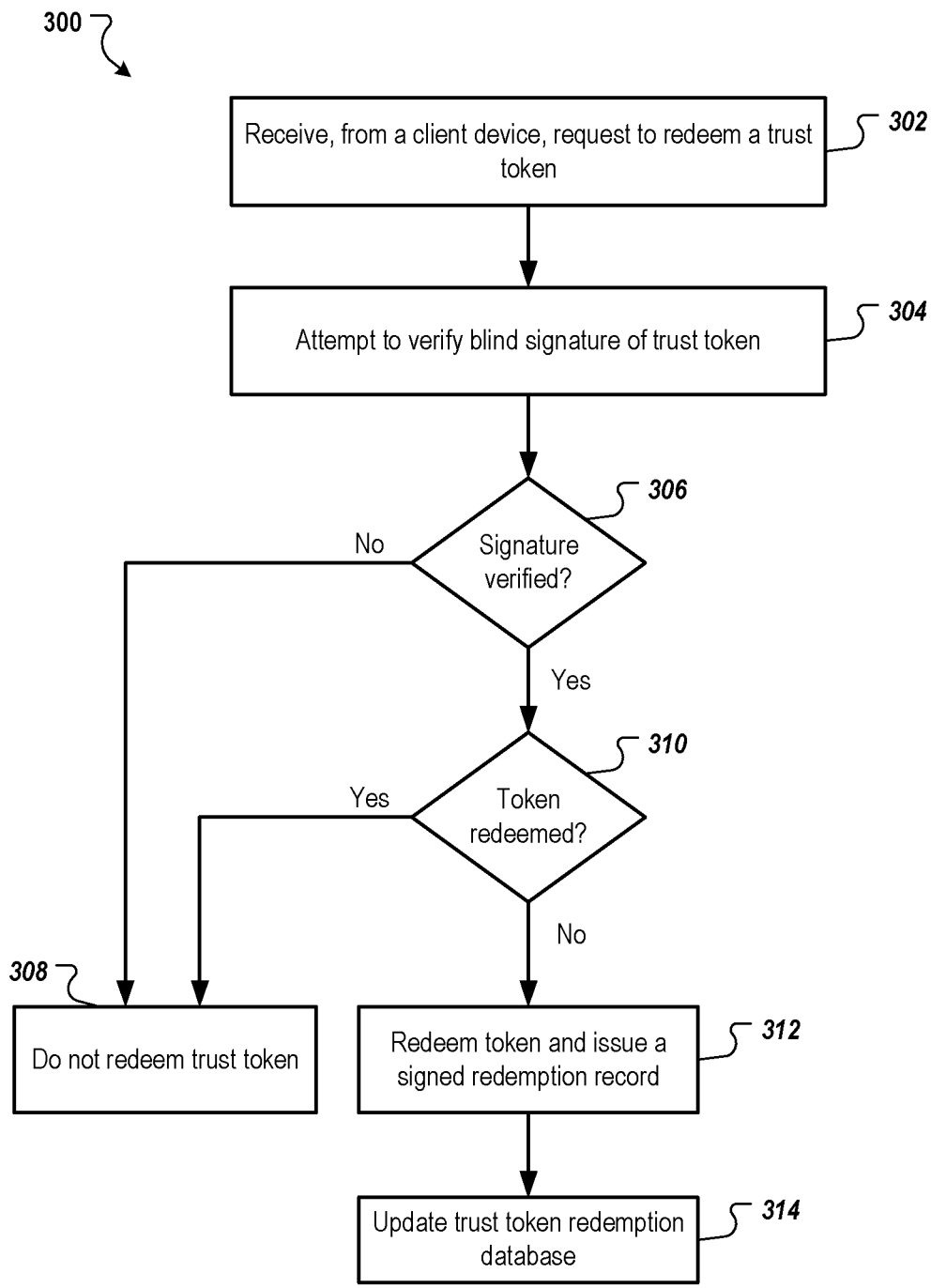
FIG. 3 is a flow diagram that illustrates an example process for redeeming trust tokens.

When the trust token issuer 132 redeems a trust token, the trust token issuer 132 can update a token redemption database 144 (or other appropriate data structure). The trust token issuer 132 can use the token redemption database 144 to ensure that each trust token is only redeemed once. The token redemption database 144 can include, for each redeemed trust token, the plaintext value of the nonce of the trust token. When the trust token issuer 132 receives a request to redeem a trust token, the trust token issuer 132 can compare the plaintext value of the nonce to the plaintext values of nonces in the token redemption database 144. If there is a match, then the trust token has already been redeemed and the trust token issuer may not issue an SRR. If there is not a match, the trust token issuer 132 may issue an SRR and update the token redemption database 144 to include the plaintext value of the nonce of the redeemed trust token, assuming the trust token is also valid. An example process for redeeming trust tokens is illustrated in FIG. 3 and described below.

Figure 4:
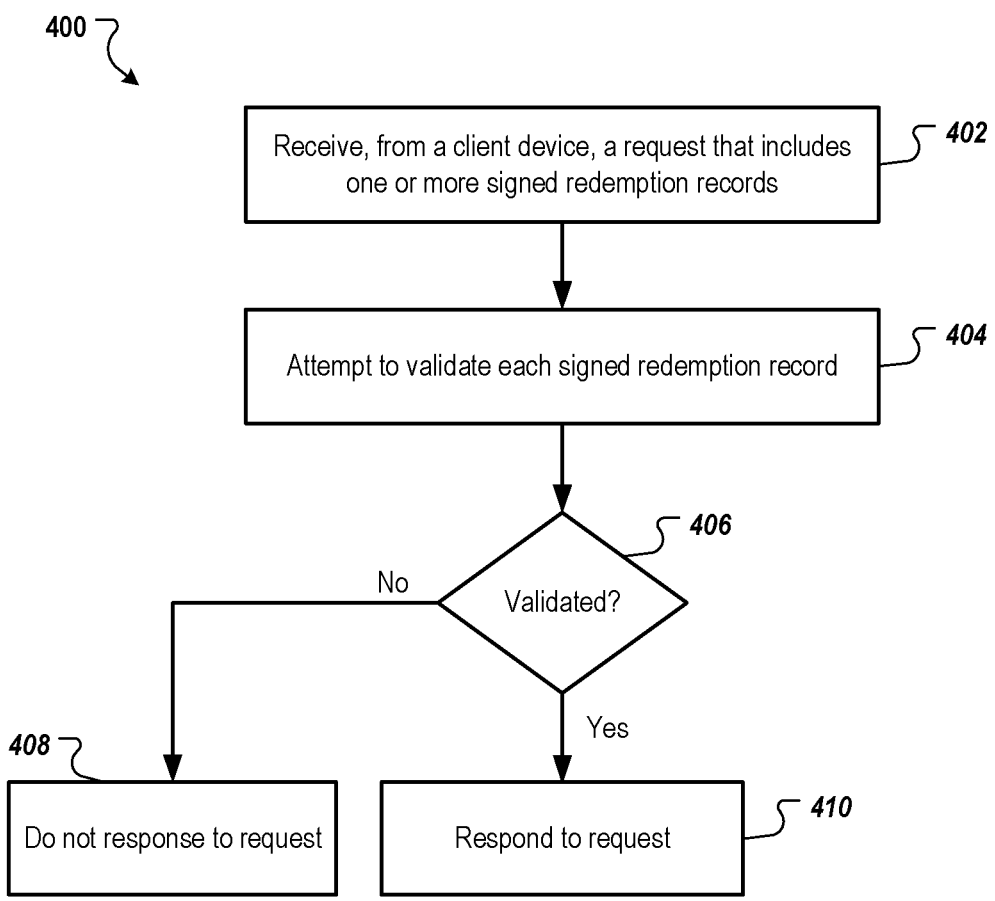
FIG. 4 is a flow diagram that illustrates an example process for processing requests that include a signed redemption record based on a redeemed trust token.

After redeeming a trust token, the application 112 can send a request to a recipient device 120 of a recipient. The request can include the SRR that was issued to the client device 110 (or application 112) in response to redeeming the trust token. The recipient device 120 can evaluate the SRR to determine whether and/or how to respond to the request. An example process for processing requests that include an SRR is illustrated in FIG. 4 and described below.

FIG. 2 is a flow diagram that illustrates an example process for issuing trust tokens. The process 200 can be implemented, for example, by a trust token system, e.g., the trust token system 130 of FIG. 1. Operations of the process 200 can also be implemented as instructions stored on non-transitory computer readable media, and execution of the instructions by one or more data processing apparatus can cause the one or more data processing apparatus to perform the operations of the process 200. For brevity, the process 200 is described in terms of the trust token system 130 of FIG. 1.

The trust token system 130 receives, from a client device 110, a request for one or more trust tokens (202). An application 112 installed on the client device 110 can initiate the request so that the application 112 can use the trust tokens to verify the integrity of the client device 110 in communications to a recipient. For example, the application 112 can request trust tokens periodically (e.g., once a day, once a week, etc.) or when the number of stored but not redeemed trust tokens for the application 112 drop to or below a threshold. To request trust tokens, the application 112 can call an API of a trusted program 114 of the client device 110, e.g., the operating system of the client device 110.

The request received by the trust token system 130 can include a nonce for each requested trust token, device-level fraud detection signals, and data related to the application 112 that initiated the request for trust tokens. In some implementations the request can also include a unique device identifier for the client device 110. The data related to the application can include an identifier for the application and a hash of code of the application.

The trust token system 130 evaluates the device-level fraud detection signals (204). For example, a device evaluator 134 of the trust token system 130 can compare operating characteristics and metrics included in the fraud detection signals to corresponding characteristics and metrics for genuine client devices, emulators, rooted devices, etc. If the characteristics and metrics of the client device 110 are similar to one of the categories of devices, the device evaluator 134 can classify the client device 110 into the category. For example, the device evaluator 134 access, for each operating characteristic or metric, a first value or first range of values characteristic of a genuine client device, a second value or second range of values characteristic of an emulator, and/or a third value or third range of values characteristic of a rooted device. The device evaluator 134 can compare each operating characteristic or metric of the client device 110 to the corresponding value or range of values for each category of device. The device evaluator 134 can perform this comparison for multiple operating characteristics and metrics and determine whether more operating characteristics and metrics are within the corresponding ranges (or closer to the ranges) for genuine devices, emulators, or rooted devices. The device evaluator 134 can then determine that the client device 110 is more similar to the category of device for which more metrics are within the range of that category of device. In other implementations, other categories of devices can be used and other types of parameters of devices can be used. In other implementations, a supervised or semi-supervised machine learning (ML) model can be trained to classify devices into multiple categories of devices, using the operating characteristics and metrics collected as input signals to the ML model and known categories of known devices as training labels.

In another example, the device evaluator 134 can assign a level of trustworthiness to the client device 110 based on the operating characteristics and metrics. For example, the device evaluator 134 can compare each operating characteristic or metric to a corresponding value or range of values indicative of trusted devices. The device evaluator 134 can assign the level of trustworthiness based on the number of operating characteristics and metrics that are within the trusted ranges and/or within a corresponding threshold value of the trusted range.

The device evaluator 134 determines, based on the evaluation, whether the client device 110 is a trusted device (206). The device evaluator 134 can determine whether the client device 110 is a trusted device based on the level of trustworthiness assigned to the client device 110. For example, the device evaluator 134 can access a trustworthiness threshold, e.g., from a database, and compare the level of trustworthiness to the trustworthiness threshold. If the level of trustworthiness satisfies (e.g., meets or exceeds) a threshold, the device evaluator 134 can determine that the client device 110 is a trusted device. If the level of trustworthiness does not satisfy the threshold, the device evaluator 134 can determine that the client device 110 is not a trusted device. In some implementations, the threshold can be set by a user of the issued trust tokens that uses the trust tokens to detect fraud, e.g., a recipient of the issued trust tokens. The threshold can also be set by the trust token system 130, e.g., by the trust token issuer 132.

In another example, the device evaluator 134 can determine whether the client device 110 is a trusted device based on the category assigned to the client device 110. The device evaluator 134 can compare the category assigned to the client device 110 to one or more categories considered trusted and one or more categories considered not trusted. For example, if the device evaluator 134 classifies the client device 110 as a genuine client device, the device evaluator 134 can determine that the client device 110 is a trusted device. If the device evaluator 134 classifies the client device 110 as an emulator or rooted device, the device evaluator 134 can determine that the client device 110 is not a trusted device. The categories for trusted device and non-trusted devices can be accessed from a database.

In another example, the device evaluator 134 can determine whether the client device 110 is a trusted device based on the number of trust tokens requested by the client device 110 over a given time period, e.g., in the most recent hour, day, week, month, etc. For example, the device evaluator 134 can access a token threshold, e.g., from a database, and compare the number of tokens requested by the client device 110 during the given time period to the threshold. If the number of tokens requested by the client device 110 during the given time period is less than the threshold, the device evaluator 134 can determine that the client device 110 is trusted. If the number of tokens requested by the client device 110 during the given time period meets or exceeds the threshold, the device evaluator 134 can determine that the client device 110 is not trusted. This provides a technical advantage of preventing potentially untrustworthy devices from being issued with trust tokens even if the device-level and application-level signals indicate that the device is trustworthy, thereby providing an improved method for detecting untrustworthy devices.

In some implementations, the device evaluator 134 can determine whether the client device 110 is a trusted device based on a combination of the evaluation of the device-level fraud detection signals and the number of trust tokens requested during the given time period. For example, the device evaluator 134 can determine that the client device 110 is a trusted device only when the level of trustworthiness satisfies its threshold (or the category assigned to the client device 110 is a trusted category) and the number of trust tokens requested by the client device 110 is less than its threshold.

If the device evaluator 134 determines that the client device 110 is not a trusted device, the trust token system 130 may not issue a trust token to the client device 110 (208). In some implementations, as described above, the trust token system 130 may issue a trust token to the client device even if the trust token is determined to not be a trusted device. In these specific implementations, this provides a technical advantage of preventing an untrustworthy device from inferring any information on how the trust token system operates, so that the untrustworthy device cannot manipulate the system. This therefore increases the security and integrity of the trust token system.

If the device evaluator 134 determines that the client device is a trusted device, the trustworthiness of the application 112 is evaluated (210). An application evaluator 136 of the trust token system 130 can evaluate the trustworthiness of the application 112. The application evaluator 136 can compare the hash of the code of the application 112 received in the request to hashes of the code of known official builds of the application to determine whether the instance of the application 112 installed on the client device 110 is an official build of the application 112. If the hash of the code of the application 112 received in the request matches a hash of the code of a known official build of the application 112, the application evaluator 136 can determine that the instance of the application 112 installed on the client device 110 is an official build of the application 112. If there is no match, the application evaluator 136 can determine that the instance of the application 112 installed on the client device 110 is not an official build of the application 112.

In some implementations, the device evaluator 134 determines whether the application 112 is a trusted application based on whether the code of the application 112 has been certified as non-malicious. For example, a trusted party, such as an operating system developer and/or an entity that operates an application store from which the application 112 can be downloaded, can evaluate the code of official versions of the application 112 to determine whether official builds of the application 112 include a virus, malware, or other malicious application logic. If no such malicious application logic is found, the trusted party can issue, for the application 112, a certificate indicating that the application 112 does not include malicious application logic. If malicious application logic is found by the trusted party, the trusted party can decline to issue a certificate or issue a certificate indicating that the application 112 includes malicious application logic. The trusted party can evaluate each official build of applications and determine whether to issue a respective certificate for each official build based on the evaluation. In examples where the trusted party is an application store, instead of issuing a certificate indicating that the application 112 is an official build and does not include malicious application logic, the application store can publish the application in the application store so that the application can be widely distributed. In some examples, instead of issuing a certificate indicating that the application 112 is an official build and does not include malicious application logic, the trusted party can insert a record to a database listing all known trustworthy applications for application 112.

The application evaluator 136 determines whether the application 112 installed on the client device 110 is trusted (212). In some implementations, the application evaluator 136 determines that the application 112 is trusted in response to determining that the application 112 is an official build. If the application 112 is not an official build, the application evaluator can consider network traffic analysis data that indicates a percentage of network traffic from unofficial builds of the application that is classified as malicious or invalid. If at least a threshold percentage of network traffic from unofficial builds of the application are considered malicious or invalid, the application evaluator 136 can determine that any instance of the application 112 that is not an official build is not trusted. If less than the threshold percentage of network traffic is considered malicious or invalid, the application evaluator 136 can determine that the application 112 is trusted although the application 112 is not an official build.

In some implementations, the application evaluator 136 determines that the application 112 is a trusted application in response to determining that the application 112 is an official build and in response to determining that a certificate indicating that the application 112 does not include malicious application logic has been issued for the build of the application 112 on the client device 112. That is, in this implementation, the application 112 has to meet both criteria.

If the application evaluator 136 determines that the application 112 is not trusted, the trust token system 130 may not issue a trust token to the client device 110 (208). If the application evaluator 136 determines that the application 112 is trusted, the trust token system generates trust tokens for the application 112.

In this example process, the trust token system 130 only issues trust tokens when both the client device 110 and the application 112 are deemed trusted. In other examples, the trust token system 130 may issue trust tokens when either the client device 110 or the application 112 is deemed trusted, e.g., by only evaluating either the client device 110 or the application 112.

A trust token issuer 132 of the trust token system 130 can generate a trust token for each nonce received in the request (214). The trust token issuer 132 can generate the trust token by generating a digital signature based on the value of the nonce. The trust token can be a combination of the nonce and the digital signature.

In some implementations, the trust token issuer 132 generates a trust token by blindly signing a blinded nonce using the same blind signature scheme used at the client device 110 to blind the nonce. In this way, the trust token issuer 132 cannot access the actual plaintext value of the nonce, but can generate a digital signature that can later be verified based on the plaintext value of the nonce. In this example, the trust token may be a combination of the blinded nonce and the blind signature of the blinded nonce. As discussed below, blinding the nonce so that the trust token issuer cannot access the plaintext value of the nonce provides a technical advantage of maintaining privacy over the user data. This is because the trust token system cannot correlate blinded nonces (seen by the trust token issuer at the time of issuing trust tokens) to the corresponding unblinded nonce (seen at the time of redeeming an issued token), and so the trust token system cannot infer any user information from the client device by attempting to correlate issued trust tokens to redeemed trust tokens.

In some implementations, the trust token can also include additional data, e.g., in the form of metadata encoded into the blind signature. The encoded metadata can help the trust token issuer 132 compare various token issuing logic and determine which one is the most efficient in fraud detection. In addition, the encoded metadata can indicate the level of the trustworthiness assigned to the device 110 and the application 112. The trust token issuer 132 can encode a small amount of information into the blind signature, in the form of hidden bit(s) and the signature verification keys. For example, if the blind signature can be verified by one of four verification keys, the trust token issuer 132 can encode two bits of information into the signature.

In some implementations, the trust token issuer 132 can encrypt each trust token using the public key of the client device 110. For example, the request for trust tokens can include the public key of the client device 110 as the unique identifier for the client device 110. By encrypting each trust token using the public key of the client device 110, only the client device 110 that has the private key can decrypt the trust tokens. This ensures that the client device 110 that submitted the request for trust tokens really has the private key and so no other client device can obtain the issued trust tokens. This therefore provides additional security over the issued trust tokens by ensuring only the client device that submitted the request and actually owns the private key corresponding to the public key can redeem the issued trust tokens. Therefore, a technical advantage of additional security over issued trust tokens is provided by encrypting each trust token using the public key of the requesting client device.

The trust token issuer 132 sends the trust tokens to the client device 110 (216). If the trust tokens are encrypted using the public key of the client device 110, the trusted program 114 can decrypt the trust tokens using the private key that corresponds to the public key. If blinded nonces are used, the application 112 (or trusted program 114) that generated the blinded nonces can verify the blind signature of each trust token. The application 112 or trusted program 114 can verify the blind signature based on the blinded value of the nonce that it created for the request for trust tokens. If the signature is not valid, the application 112 or trusted program 114 can reject the trust tokens.

If the signature is valid, the application 112 or trusted program 114 can unblind the blinded nonce using the blind signature scheme that was used to blind the nonce and blindly sign the blinded nonce. Unblinding the nonce can include removing the blinding factor from the nonce such that the nonce is no longer obscured. Depending on the blind signature scheme, the application 112 or trusted program 114 can also unblind the blind signature using the blind signature scheme, e.g., by removing the blinding factor from the blind signature.

The application 112 can then store, for each trust token, an unblinded version of the trust token that includes the unblinded nonce (e.g., the plaintext nonce) and the blind signature either in blinded or unblinded form. That is, the application 112 can update or generate a new version of the trust token that includes the unblinded nonce and the blind signature. The application 112 can store the trust tokens in a secure storage location at the client device 110.

FIG. 3 is a flow diagram that illustrates an example process 300 for redeeming trust tokens. The process 300 can be implemented, for example, by a trust token system, e.g., the trust token system 130 of FIG. 1. Operations of the process 300 can also be implemented as instructions stored on non-transitory computer readable media, and execution of the instructions by one or more data processing apparatus can cause the one or more data processing apparatus to perform the operations of the process 300. For brevity, the process 300 is described in terms of the trust token system 130 of FIG. 1.

The trust token system 130 receives, from a client device 110, a request to redeem a trust token (302). An application 112 running on the client device 110 can issue the request to redeem the trust token in response to initiating a request to a recipient that requires the requests to include an SRR. For example, when a web browser navigates to a particular website of a publisher, the website or a module of another domain embedded in the website can request the web browser to redeem a trust token to ensure that the client device 110 and web browser are trusted.

The application 112 can obtain a trust token from trust tokens issued to the application 112 and send, to the trust token system 130, a redemption request that includes the trust token. The request can also include a public key (or the crypto hash of the public key) generated by the application 112. Continuing the web browser example, the request can include a public key that the browser created for the domain of the website being presented by the web browser and data identifying the domain. The web browser can generate a key pair for each domain visited by the web browser. Each key pair can include a public key and a corresponding private key.

If blinded nonces are used to generate the trust tokens, the trust tokens sent for redemption can include the unblinded nonce and the blind signature rather than the blinded nonce. In this way, the trust token system 130 cannot correlate the trust token submitted for redemption with the trust token issued to the application 112, which means that the trust token system cannot infer any information regarding the client device or the user of the client device from the issued and subsequently redeemed trust tokens. This therefore provides a technical advantage of maintaining user privacy when redeeming trust tokens. As the trust token system 130 can store data linking the issued trust token (and therefore the blinded nonce) and the level of trustworthiness assessed when issuing the trust token with the device identifier for the client device 110, the trust token system 130 would otherwise be able to correlate the recipients of SRRs from the client device 110 with the level of trustworthiness. However, using trust tokens with unblinded nonces at redemption prevents correlating trust tokens to device-level fraud detection signals and data related to the application 112 in operations 204 and 210 of FIG. 2, as the trust token system 130 cannot correlate the unblinded nonce with the blinded nonce. Thus, this technique protects the privacy of users.

The trust token system 130 attempts to verify the blind signature of the received trust token (304). For example, a trust token issuer 132 of the trust token system 130 can attempt to verify the blind signature using the blind signature scheme used to blindly sign the blinded nonce of the issued trust token. The trust token issuer 132 can verify the blind signature using the blind signature scheme and the plaintext value of the unblinded nonce.

If the blind signature is not verified successfully (306), the trust token system 130 may not redeem the trust token (308). If the blind signature is verified successfully, the trust token issuer 132 determines whether the trust token has already been redeemed (310). This determination can be performed before, after, or in parallel or otherwise asynchronously with verifying the blind signature.

The trust token issuer 132 can compare the unblinded nonce to unblinded nonces of previously redeemed trust tokens, e.g., stored in the token redemption database 144. The previously redeemed trust tokens can include redeemed tokens from the client device 110 or from multiple client devices 110. If there is a match between the unblinded nonce of the trust token to be redeemed and an unblinded nonce of a previously redeemed trust token, the trust token issuer 132 can determine that the trust token has been previously redeemed. If there is no match between the unblinded nonce of the trust token to be redeemed and an unblinded nonce of a previously redeemed trust token, the trust token issuer 132 can determine that the trust token has not been previously redeemed.

If the trust token has previously been redeemed, the trust token issuer 132 may not redeem the trust token again (308). If the trust token has not yet been redeemed, the trust token issuer 132 can redeem the trust token and issue an SRR to the application 112 (312).

The SRR can include a set of data that includes redemption timestamp that indicates a time and date at which the SRR was generated, data identifying the domain of the website identified in the redemption request, the public key that the browser created for the domain, and/or data identifying the trust token system 130 that issued and redeemed the trust token as there may be multiple trust token systems. The SRR can also include a digital signature of the set of data generated using a private key of the trust token system 130. In this way, the recipient and any other entities can verify that the set of data is not manipulated by verifying the digital signature using a public key that corresponds to the private key of the trust token system 130. Including the public key that the browser created for the domain with the data being signed using the private key of the trust token system 130 binds the SRR to that particular domain and the browser. The trust token issuer 132 can generate the SRR and send the SRR to the application 112 that requested redemption of the trust token.

The trust token issuer 132 can also update the token redemption database 144 to indicate that the trust token has been redeemed (314). For example, the trust token issuer 132 can add the plaintext value of the unblinded nonce to the token redemption database 144 to prevent the trust token from being redeemed multiple times.

FIG. 4 is a flow diagram that illustrates an example process 400 for processing requests that include a signed redemption record based on a redeemed trust token. The process 400 can be implemented, for example, by a recipient device, e.g., a recipient device 120 of FIG. 1. Operations of the process 400 can also be implemented as instructions stored on non-transitory computer readable media, and execution of the instructions by one or more data processing apparatus can cause the one or more data processing apparatus to perform the operations of the process 400. For brevity, the process 400 is described in terms of the trust token system 130 of FIG. 1.

The recipient device 120 receives, from a client device 110, a request that includes one or more SRRs (402). The request can include an SRR generated for a redeemed trust token generated based on the device and application evaluations described above. In some implementations, the request can include an additional SRR generated based on a trust token issued based on an evaluation of user interactions with an application or multiple applications on the client device, e.g., based on an evaluation and determination that the user interactions are genuine user interactions rather than emulated user interactions. The SRR(s) of the request can include the SRR(s) generated by a trust token system 130 for the application 112 (or trusted program 114 in FIG. 1) based on a redeemed trust token.

The request can also include a digital signature of the other content of the request, e.g., including the SRR. The application 112 or trusted program 114 can generate the digital signature using the private key that the application 112 created for the domain. This private key corresponds to the public key that the application 112 created for the domain. Either the public key, or its crypto hash result, is included in the SRR. In this way, the request and the SRR are bound to the domain.

The recipient device 120 attempts to validate each SRR (404). This validation can include attempting to verify the digital signature of the SRR using a public key of the trust token system 130 that generated the SRR. The recipient device 120 can also determine whether the redemption timestamp is within a threshold amount of time of a current time to ensure that the SRR is not stale.

The recipient device 120 determines whether each SRR is validated (406). The recipient device 120 can determine whether an SRR is validated based on whether the digital signature of the SRR is verified and/or whether the redemption timestamp is within the threshold amount of time. If the digital signature is successfully verified and the redemption timestamp is within the threshold amount of time of a current time, the recipient device 120 can determine that the SRR is validated. If the digital signature is not successfully verified or the redemption timestamp is not within a threshold amount of time of a current time, the recipient device 120 can determine that the SRR is not validated.

In some implementations, the recipient device 120 can also verify the digital signature of the request using the public key that the application created for the domain, e.g., which (or whose crypto hash result) may be included in the SRR and/or the request itself. If the digital signature cannot be validated, the recipient device 120 can determine that the request is invalid and may not respond to the request.

If each SRR is not validated, the recipient device 120 may not respond to the request (408). For example, the recipient device 120 may ignore the request.

If each SRR is validated, the recipient device 120 responds to the request (410). For example, the recipient device 120 can provide content in response to the request, update data or settings in response to the request, etc. based on the request.

Figure 5:
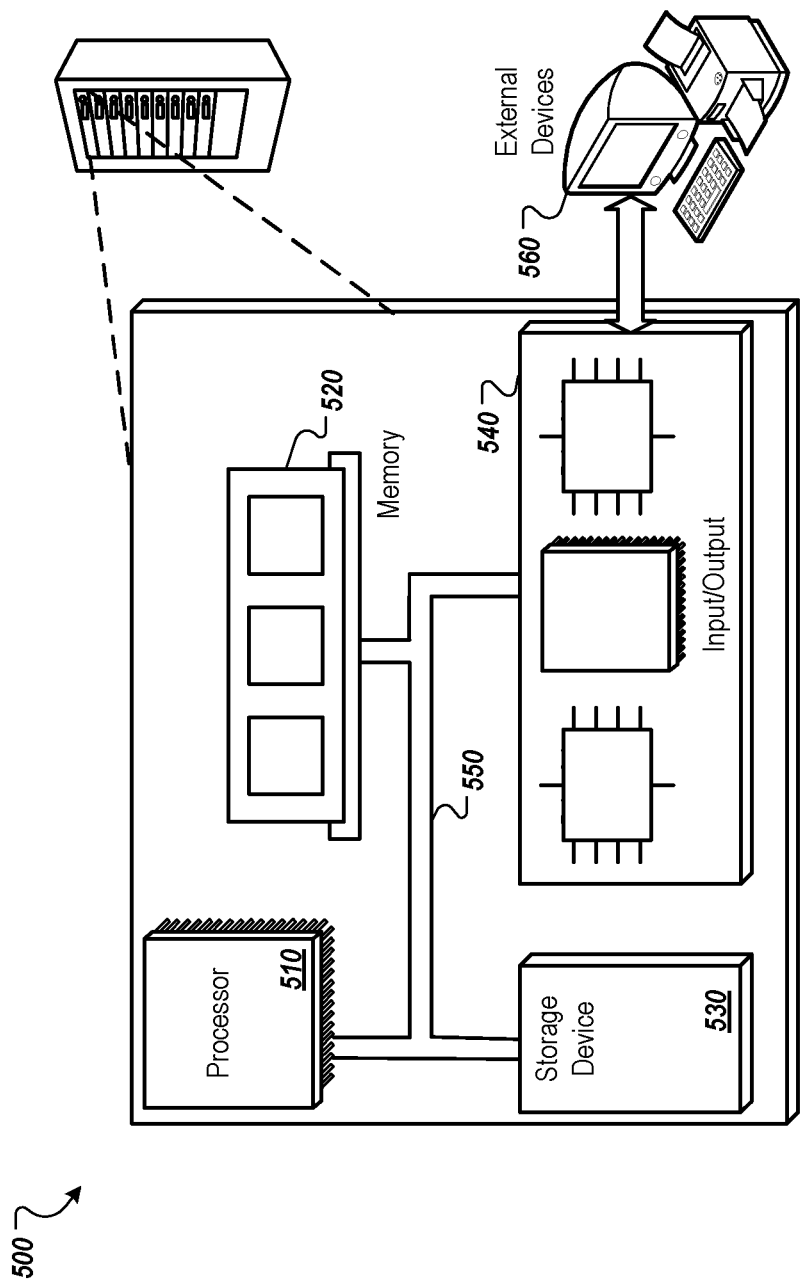
FIG. 5 is a block diagram of an example computer system that can be used to perform operations described above.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 600. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   receiving, from a client device, a request for one or more trust tokens, the request comprising:
   at least one of (i) one or more device-level fraud detection signals obtained from the client device or (ii) data representing code of an application that initiated the request; and
   a respective nonce for each of the one or more trust tokens, wherein the nonce for each trust token is a blinded nonce that was blinded using a blind signature scheme;
   determining, based on at least one of (i) the one or more device-level fraud signals or (ii) the data representing the code of the application, to issue the one or more trust tokens to the client device;
   in response to determining to issue the one or more trust tokens to the client device:
   generating each of the one or more trust tokens using the nonce for the trust token; and
   providing the one or more trust tokens to the client device.

2. The method of claim 1, wherein determining, based on at least one of (i) the one or more device-level fraud signals or (ii) the data representing the code of the application, to issue the one or more trust tokens to the client device comprises:
   determining, based on the one or more device-level fraud signals, that the client device is a trusted device;
   determining, based on the data representing the code of the application, that the application is a trusted application; and
   in response to determining that the client device is a trusted device and the application is a trusted application, determining to issue the one or more trust tokens to the client device.

3. The method of claim 1, wherein the data representing the code of the application comprises a cryptographic hash of the code of the application.

4. The method of claim 1, wherein determining to issue the one or more trust tokens to the client device comprises:
   determining, based on the code of the application, that the application is a trusted application; and
   in response to determining that the application is a trusted application, determining to issue the one or more trust tokens to the client device.

5. The method of claim 4, wherein determining that the application is a trusted application comprises:
   comparing a cryptographic hash of the code of the application to cryptographic hashes of code of official builds of the application; and
   determining that the application is a trusted application in response to the cryptographic hash of the code of the application matching a cryptographic hash of code of an official build of the application.

6. The method of claim 4, wherein determining that the application is a trusted application comprises determining that a certificate indicating that the application does not include malicious application logic has been issued for the application.

7. The method of claim 1, wherein generating each of the one or more trust tokens comprises generating, using a blind signature scheme, a blind signature of the blinded nonce for the trust token, wherein the trust token comprises the blinded nonce and the blind signature of the blinded nonce.

8. The method of claim 7, further comprising:
   receiving, from the client device, a redemption request comprising a given trust token for redemption, wherein the given trust token comprises an unblinded nonce and a blind signature generated based on a blinded version of the nonce;
   validating the blind signature of the given trust token using the unblinded nonce and the blind signature scheme; and
   in response to validating the blind signature, sending, to the client device, a signed redemption record for the given trust token.

9. The method of claim 1, wherein the request further comprises a public key for the client device, the method further comprising encrypting each of the one or more trust tokens using the public key for the client device, and wherein providing the one or more trust tokens to the client device comprises providing the one or more encrypted trust tokens to the client device.

10. The method of claim 1, wherein the request comprises a device identifier for the client device, the method further comprising maintaining a historical record of trustworthiness for the client device using the device identifier, wherein determining to issue the one or more trust tokens to the client device comprises determining, based on a combination of the device-level fraud detection signals and the historical record of trustworthiness for the client device, that the client device is a trusted device.

11. The method of claim 10, wherein determining, based on a combination of the device-level fraud detection signals and the historical record of trustworthiness for the client device, that the client device is a trusted device comprises determining, based on a combination of the device-level fraud detection signals, the historical record of trustworthiness for the client device, and a number of trust tokens requested by client device during a given time period, that the client device is a trusted device.

12. A system, comprising:
one or more processors; and
one or more computer-readable media storing instructions that, when executed by the one or more processors, cause the one or more processors to perform operations comprising:
- receiving, from a client device, a request for one or more trust tokens, the request comprising:
  - at least one of (i) one or more device-level fraud detection signals obtained from the client device or (ii) data representing code of an application that initiated the request; and
  - a respective nonce for each of the one or more trust tokens, wherein the nonce for each trust token is a blinded nonce that was blinded using a blind signature scheme;
- determining, based on at least one of (i) the one or more device-level fraud signals or (ii) the data representing the code of the application, to issue the one or more trust tokens to the client device;
- in response to determining to issue the one or more trust tokens to the client device:
  - generating each of the one or more trust tokens using the nonce for the trust token; and
  - providing the one or more trust tokens to the client device.

13. The system of claim 12, wherein determining, based on at least one of (i) the one or more device-level fraud signals or (ii) the data representing the code of the application, to issue the one or more trust tokens to the client device comprises:
- determining, based on the one or more device-level fraud signals, that the client device is a trusted device;
- determining, based on the data representing the code of the application, that the application is a trusted application; and
- in response to determining that the client device is a trusted device and the application is a trusted application, determining to issue the one or more trust tokens to the client device.

14. The system of claim 12, wherein the data representing the code of the application comprises a cryptographic hash of the code of the application.

15. The system of claim 12, wherein determining to issue the one or more trust tokens to the client device comprises:
- determining, based on the code of the application, that the application is a trusted application; and
- in response to determining that the application is a trusted application, determining to issue the one or more trust tokens to the client device.

16. The system of claim 15, wherein determining that the application is a trusted application comprises:
- comparing a cryptographic hash of the code of the application to cryptographic hashes of code of official builds of the application; and
- determining that the application is a trusted application in response to the cryptographic hash of the code of the application matching a cryptographic hash of code of an official build of the application.

17. The system of claim 15, wherein determining that the application is a trusted application comprises determining that a certificate indicating that the application does not include malicious application logic has been issued for the application.

18. The system of claim 12, wherein generating each of the one or more trust tokens comprises generating, using a blind signature scheme, a blind signature of the blinded nonce for the trust token, wherein the trust token comprises the blinded nonce and the blind signature of the blinded nonce.

19. One or more non-transitory computer-readable media storing instructions that, when executed by one or more computers, cause the one or more computers to perform operations comprising:
- receiving, from a client device, a request for one or more trust tokens, the request comprising:
  - at least one of (i) one or more device-level fraud detection signals obtained from the client device or (ii) data representing code of an application that initiated the request; and
  - a respective nonce for each of the one or more trust tokens, wherein the nonce for each trust token is a blinded nonce that was blinded using a blind signature scheme;
- determining, based on at least one of (i) the one or more device-level fraud signals or (ii) the data representing the code of the application, to issue the one or more trust tokens to the client device;
- in response to determining to issue the one or more trust tokens to the client device:
  - generating each of the one or more trust tokens using the nonce for the trust token; and
  - providing the one or more trust tokens to the client device.

20. The one or more non-transitory computer-readable media of claim 19, wherein generating each of the one or more trust tokens comprises generating, using a blind signature scheme, a blind signature of the blinded nonce for the trust token, wherein the trust token comprises the blinded nonce and the blind signature of the blinded nonce.

* * * * *